(12) United States Patent
Stevenson et al.

(10) Patent No.: US 6,766,367 B1
(45) Date of Patent: Jul. 20, 2004

(54) METHOD AND APPARATUS FOR FETCHING SPARSELY INDEXED MIB TABLES IN MANAGED NETWORK SYSTEMS

(75) Inventors: David James Stevenson, Edinburgh (GB); Andrew Hunter Gray, West Lothian (GB); Robert James Duncan, Edinburgh (GB); Alastair Hugh Chisholm, Edinburgh (GB); Vanessa Serra, Edinburgh (GB); Colin Tinto, Edinburgh (GB)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/500,405

(22) Filed: Feb. 8, 2000

(30) Foreign Application Priority Data

Aug. 4, 1999 (GB) .............................................. 9918433

(51) Int. Cl.[7] ........................ G06F 15/173; G06F 17/30
(52) U.S. Cl. ...................................... 709/223; 707/10
(58) Field of Search ................................ 709/217, 223, 709/230; 707/3, 10, 1–5, 103

(56) References Cited

U.S. PATENT DOCUMENTS

| | | | |
|---|---|---|---|
| 5,978,850 A | * 11/1999 | Ramachandran et al. | ... 709/228 |
| 6,009,431 A | * 12/1999 | Anger et al. | ................... 707/10 |
| 6,032,183 A | * 2/2000 | Chen et al. | ................... 709/223 |
| 6,122,626 A | * 9/2000 | Brandsma | ........................ 707/3 |
| 6,134,541 A | * 10/2000 | Castelli et al. | ................... 707/2 |
| 6,317,748 B1 | * 11/2001 | Menzies et al. | ........ 707/103 X |
| 6,360,258 B1 | * 3/2002 | LeBlanc | ..................... 709/223 |
| 6,439,783 B1 | * 8/2002 | Antoshenkov | ................. 707/3 |
| 6,446,079 B2 | * 9/2002 | Tooker et al. | .............. 707/100 |
| 6,484,175 B1 | * 11/2002 | Stewart | ........................ 707/10 |
| 6,519,635 B1 | * 2/2003 | Champlin et al. | .......... 709/223 |
| 6,539,540 B1 | * 3/2003 | Noy et al. | ................... 717/141 |
| 6,631,406 B1 | * 10/2003 | Pantages et al. | ............ 709/223 |
| 6,671,722 B1 | * 12/2003 | Stachura et al. | ............ 709/224 |

FOREIGN PATENT DOCUMENTS

| | | | |
|---|---|---|---|
| EP | 0 621 705 A2 | 10/1994 | ........... H04L/12/24 |
| EP | 0 621 706 A2 | 10/1994 | ........... H04L/12/24 |

OTHER PUBLICATIONS

Sharda et al. "Applying Deductive Database Technology to Network Management", Jan. 1997, ACM SIGCOMM Computer Comunication Review, Vol. 27, Issue 1, pp. 42–54.*
Stallings, William, "SNMP, SNMPv2, SNMPv3, and RMON 1 and 2", 1999, Addison–Wesley, pp. 173–192, 378–383.*
Godura et al., "Use of Control Variables to Convey Protocol Semantics in SNMP", IEEE.*
Waldbusser, S., "RFC 2021: Remote Network Monitoring Management Information Base Version 2 using SMIv2", IETF, Jan. 1997.*
Godura et al., "Use of Control Variables to Convey Protocol Semantics in SNMP", IEEE.*
Perkins, David and McGinnis, Evan, "*Understanding SNMP MIBs*", 1996 Prentice Hall Inc., N.J. (*ISSN 0 134377087*), pp. 4–8 (5 pages).

* cited by examiner

*Primary Examiner*—Jack B. Harvey
*Assistant Examiner*—Douglas Blair
(74) *Attorney, Agent, or Firm*—McDonnell Boehnen; Hulbert & Berghoff LLP

(57) ABSTRACT

A method for fetching sparsely indexed MIB tables for a managed network device using an approximation operation, such as a GetNext SNMP operation, comprises sending a plurality of operations in a first data packet at least one of the plurality of approximation operations specifying a speculative approximation. By using speculative approximations of index values of data to be fetched, it is possible to retrieve MIB table data more quickly and efficiently.

20 Claims, 2 Drawing Sheets

METHOD AND APPARATUS FOR FETCHING SPARSELY INDEXED MIB TABLES IN MANAGED NETWORK SYSTEMS

BACKGROUND OF THE INVENTION

1. Field of the Invention

The present invention relates generally to communication systems and more particularly to networks having managed devices.

2. Description of the Related Art

The following description is concerned with a data communications system such as a local area network (LAN), that is an Ethernet network. However, the skilled person will appreciate that the present invention will have more general applicability to other types of managed communications systems including wireless networks.

A local area network (LAN) typically comprises a plurality of computers, computer systems, workstations and other electronic devices connected together by a common media such as twisted pair or coaxial cable or fibre optic cable. Data can be communicated between devices on the network by means of data packets (or frames) in accordance with a predefined protocol.

Computers and other devices connected to a network can be managed or unmanaged devices. A managed device has processing capability which enables it to monitor data traffic sent from, received at, and passing through the ports of the device. Monitored data associated with the ports oft he network device is stored in memory on the network device.

Network devices typically represent data in the form of a MIB (Management Information Base), as is well known in the art. A typical managed device may implement a number of MIBs (defined in RFCs), of which one (or more) represents data used in network management, as described below.

An example of a MIB containing network management data is MIB-II (formerly MIB-I) as specified by the IETF (Internet Engineering Task Force). MIB-II is common to core managed network devices of most vendors. Another MIB containing more complex management data is RMON (Remote Monitoring). As is well known in the art, each class or type of management information represented in a MIB is called an "object". A specific instance from a data object is called an "object instance". An object may be defined to have one instance (a scalar object), or multiple instances (a columnar object). Columnar objects are typically organised into "conceptual tables" (hereinafter referred to as "tables") and all the objects in a table use the same indexing scheme for identifying instances of that object. Thus, tables can be thought of as an array of rows and columns, each column comprising all instances of a particular object and each row comprising the instances of all objects at a common index (the index for the row).

It is becoming increasingly common and necessary for an individual to be appointed to manage a network. The appointed network manager (or administrator) utilises a network management station which includes network management hardware and software. In particular, the network management station is able to access management data from managed network devices using an appropriate management protocol (e.g. the SNMP protocol) and display this data for use by the network manager.

The SNMP (Simple Network Management Protocol) defines the procedure and data packet format for the network management station to access network data from MIBs in managed network devices for TCP/IP-based networks. In SNMP the data packet or PDU (Protocol Data Unit) is defined to have a size of 1500 bytes. The SNMP protocol utilises five main commands: GET, SET, GETNEXT, GET-RESPONSE and TRAP.

The GET request is sent by the network management station to a network device to fetch a value of an object or objects from a MIB. The GET request specifies an object using a unique "object identifier" which is defined in the MIB, which includes an index to identify the required instance of the object.

The SET request is sent by the network management station to write a value to a MIB. Like the GET request, the SET request specifies an object identifier of the object whose value should be modified and additionally specifies the new value to be written to the object.

The GETNEXT request, an example of an approximation operation as explained below, is used by the network management station to inter alia fetch object data in MIB tables. The network management station can use the GETNEXT command to fetch the data in a complete MIB table or a part thereof without knowing, in advance, the index values of data stored in the MOB table or part thereof. For example, the network management station will initially send a GETNEXT request specifying the "table root". The table root can be thought of as the "column titles" since it is a placeholder after which the first row in the table, that is the row having the lowest index value, is guaranteed to appear. Thus, a GETNEXT request specifying the table root retrieves the first row in the table. The network management station will then use the response to this request in the subsequent GETNEXT command to fetch the next row in the table. The network management station will continue to iterate using the GETNEXT command until the data for all the rows in the relevant MIB table have been fetched.

Thus, because the GETNEXT command is an approximation operation, it does not need to specify the exact index of the object instance to be fetched at each command, as is necessary for the GET and SET commands, but merely an approximation of the index.

If a MIB table is indexed systematically with all indices within a bounded range present, for example 1 to 10, the network management station can issue a direct SNMP GET request for the values in the indexed rows and can pack the maximum number of requests into a single SNMP data packet (1500 bytes for an SNMP PDU) for transmission to the network device. However, if the table index values are sparse, then in the prior art the management station has no choice but to fetch the rows using the GETNEXT command. Because each GETNEXT request uses the response from the previous request, the management station can only fetch one row at a time, since it must wait for the information (i.e. the index value) contained in the response of the previous request before it can formulate the next request (i.e. using the index value as the approximation).

By way of example, a simple MIB table is represented in Table 1 below.

TABLE 1 testTable

| | testA (index) | testB |
|---|---|---|
| row 1 | 2 | 6 |
| row 2 | 3 | 13 |
| row 3 | 7 | 9 |

This MIB table, called "testTable", has two columns, with object identifiers "testA" and "testB" of which "testA" is identified in the MIB as being an index for testTable. Values for testA and testB values are integer values. Thus, the value stored in the "testA" column is the value used to identify (i.e. index) the row in the table. Accordingly, the index which identifies the first row in the table is "2", the index which identifies the second row in the table is "3" and the index which identifies the third row in the table is "7". Thus, the rows of testTable are sparsely indexed as 2, 3 and 7 (instead of the systematically indexed 1, 2 and 3).

To fetch the whole of testTable, the network management station will typically send a GETNEXT request for the table root which will retrieve data at the lowest index value, and will then iterate using the previous response as the request each time until all the rows have been fetched. This looks like:

| GetNext request: | testA | testB |
|---|---|---|
| response: | testA.2 = 2 | testB.2 = 6 |
| GetNext request: | testA.2 | testB.2 |
| response: | testA.3 = 3 | testB.3 = 13 |
| GetNext request: | testA.3 | testB.3 |
| response: | testA.7 = 7 | testB.7 = 9 |
| GetNext request: | testA.7 | testB.7 |
| response: | off end table | off end table |
| <finished> | | |

The main problem with the above described known method is that fetching of sparsely indexed MIB tables by the network management station is very slow, which causes delays and generates a lot of data traffic on the network. Furthermore, the utilisation oft he available byte space in data packets is poor.

In network management, it is very common for MIBs to include sparsely indexed MIB tables due to deletions, additions and changes to rows of data which arise during the dynamic operation of a network. Thus, as demands on the network resources increase, the above problems become increasingly significant.

It would be desirable to provide a method and apparatus for fetching sparsely indexed MIB tables in a more efficient manner.

SUMMARY OF THE INVENTION

According to a first aspect, the present invention provides a method for fetching sparsely indexed data for at least one data object in a data communications system using a communications protocol which defines a data packet format and an approximation operation, whereby the approximation operation retrieves the data object which has the closest available index value to, and which is greater than or less than, an approximation of the index value specified in the approximation operation, the method comprising sending a plurality of approximation operations in a first data packet, at least one of the plurality of approximation operations specifying a speculative approximation.

By employing speculative approximations of index values of data objects to be fetched, a network management station operating in accordance with the method of the present invention can include a plurality of approximation operations in a data packet, thus improving the speed of retrieving a table of data and utilising more of the byte-space available in a data packet in comparison with the known method.

BRIEF DESCRIPTION OF THE DRAWINGS

An embodiment oft he present invention will now be described, by way of example, with reference to the accompanying drawings, in which.

DETAILED DESCRIPTION OF THE PREFERRED EMBODIMENTS

Figure 1A:
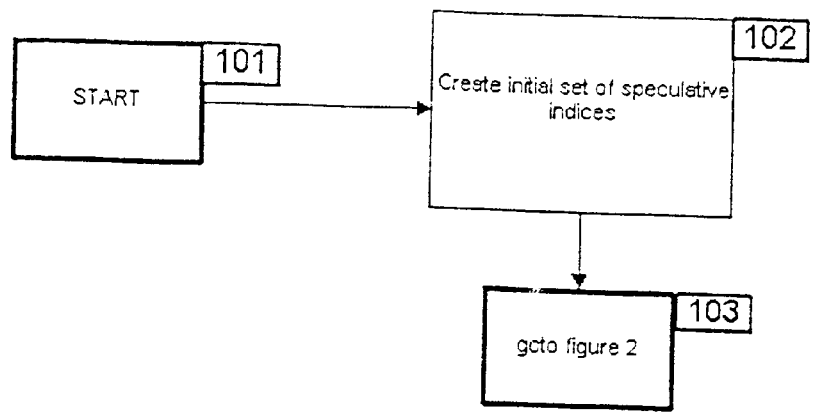
FIGS. 1a, 1b and 2 together provide a flow chart illustrating one way of programming a processor of a network management system to carry out the method of the present invention.

The following description relates to a sparsely indexed MIB table known as the protocolDistribution table in RMON 2, a MIB containing network management data. The protocolDist table is defined by RFC 2021 which is hereby incorporated by reference. The skilled person will appreciate that the apparatus and method of the present invention has general applicability and can be used in relation to other MIB tables.

The protocolDist table is indexed partially by the object called the protocolDirLocalIndex object (referred to herein as "local index"). The set of values for the local index tends to remain static on a given interface of a network device.

Generally, in accordance with the present invention, the network management station of the preferred embodiment attempts to fit up to the maximum number of requests into a single GetNext request data packet of standard SNMP PDU size (1500 bytes) (which maximum number can also preferably be returned on a single data packet). As is well known in the art, each individual request is known as a "varbind" and the complete set of requests in a data packet is a "varbind list". The size of each varbind depends upon the data object or objects requested, and thus the maximum possible number of request in the varbind list depends on the MIB table being fetched and is typically between 20 and 40. In the case of the protocolDist table, the maximum number of varbinds possible in a standard SNMP PDU is 32.

In accordance with the preferred embodiment oft he present invention, the network management station starts with a set of up to 32 'seed' values between root (−) and 1024. The 'seed' values are effectively speculative values used as approximations in GetNext requests, which predict or speculate on the index values present in the table. This set of 32 seed values are preferably based on previous requests for the same MIB table which can be used to predict the index values which will be present in subsequent requests (as will be understood from the following). However, if there are no previous requests, the seed values are taken to be the table root (−) and 31 index values at regular intervals within the expected range of index values. Thus, for the protocolDist table in which the expected index value range is 1 to 1024, the seed values will be: root, 32, 64, 96, 128 . . . 988, the interval between seed values being 32, the result of dividing the highest possible index value (max index=1024) by the number of varbinds per packet (max varbinds=32).

Each seed value after the first (which is always root) can be represented by the formula:

$$\text{seed value } n = (n-1) \text{ (max index/max varbind)} \quad \text{(equation 1)}$$

Each seed value represents an approximation of index values falling within a range or "thread" of index values, so that the approximations are not confined to a limited part of the possible full range of index values. This is particularly advantageous for sparse tables where a plurality of approximations within a confined range could return the same object instance, which would be inefficient.

Assuming a first sample (i.e. no prediction based on previous requests) the network management station sends a GetNext request data packet of 32 GetNext commands using the set of 32 seed values (–, 32, 64, 96, 128 . . . 988) and examines the response to determine the set of values to be used in the subsequent GetNext request.

For example, if the response to GetNext 64 is 98, then there are no index values present in the range 65 and 96 and so no further GetNext requests are necessary for that range. However, the response to GetNext 96 would also be 98. It would still be possible for there to be index values present between 98 and 128. Therefore, a further GetNext request specifying the value 98 as the approximation needs to be included in the next data packet sent, along with any other requests within the other ranges or "threads" of 32 index values.

The process is repeated until all possible index values have been retrieved.

During this process, the network management station stores the indices marked as present in the MIB table for future use in prediction, as explained in more detail below.

EXAMPLE 1

Initial Sample

To illustrate the above process for an initial sample, assume a simplified MIB table of a maximum of thirty rows (rather than 1024 as in the protocol Dist table) with eight rows present having local indices (on the probe) of: 1 2 4 7 8 11 16 25. For the purposes of this example, the maximum number of varBinds in a PDU is three (rather than the 32 possible varBinds for an SNMP PDU in the embodiment as described above). The first three seed values will be—, 10, 20 in accordance with the above-mentioned calculation using equation 1, where max index=30 and max varbinds=3. The first SNMP data packet sent by the network management station will thus contain the three separate requests GetNext—, GetNext 10 and GetNext 20. If all indices were present, these requests would be expected to return the index values 1, 11, 21. However, in this example, the response will contain data at the index values 1, 11 and 25. The index value in response to GetNext 20 is 25, rather than 21 since index value 21 is not present in the MIB table. The network management station stores the index values 1, 11 and 25 as present, recognising that local indices 21 to 24 are not present.

In the second data packet sent by the network management station, the responses to the first request will be used as seed values i.e. 1, 11 and 25. If all indices were present, these requests would be expected to return the index values 2, 12 and 26. The seed values between 21 and 24 are not used since the network manager already knows that these requests will return 25, the same index value returned by GetNext 20. Thus the second packet contains the requests GetNext 1, GetNext 11 and GetNext 25. The response is 2, 16,—since the indices 12 to 15, and indices above 25 are not present in the MIB table. The network management station stores the index values 2 and 16 as present and recognises that indices 12 to 15 are missing and there are no further indices in the range 21 to 30. The process continues as shown in Table 2 below.

TABLE 2

|   | local Index values | | | predicted values for next sample | | | | | | |
|---|---|---|---|---|---|---|---|---|---|---|
| 1. request: | — | 10 | 20 | | | | | | | |
| response: | 1 | 11 | 25 | 1 | 11 | 25 | | | | |
| 2. request: | 1 | 11 | 25 | | | | | | | |
| response: | 2 | 16 | — | 1 | 2 | 11 | 16 | 25 | | |
| 3. request: | 2 | 16 | | | | | | | | |
| response: | 4 | 25 | | 1 | 2 | 4 | 11 | 16 | 25 | |
| 4. request: | 4 | | | | | | | | | |
| response: | 7 | | | 1 | 2 | 4 | 7 | 11 | 16 | 25 |
| 5. request: | 7 | | | | | | | | | |
| response: | 8 | | | 1 | 2 | 4 | 7 | 8 | 11 | 16 | 25 |
| 6. request: | 8 | | | | | | | | | |
| response: | 11 | | | 1 | 2 | 4 | 7 | 8 | 11 | 16 | 25 |

1. The initial request uses the speculative seed values calculated using equation 1.
2. The second request uses the responses from the first request to advance each request thread. The request GetNext 25 receives no response and the system therefore knows this thread (index values 20 to 30) is complete.
3. The third request uses the responses from the previous request to advance the remaining threads. The response to the request GetNext 16 is 25, which has already been retrieved. The system now knows that there are no index values present between 16 and the start of the next thread (i.e. 20), so this thread is also complete.
4. The fourth request continues with the first thread.
5. And again.
6. The response to GetNext 8 is 11, which has been already retrieved. The system now knows that there are no index values present between 8 and the start of the next thread (i.e. 10), so this thread is complete. This was the final thread, so the system now knows that the complete table has been fetched.

Thus, the process in this example uses only six GetNext request data packets to retrieve the eight indexed rows of data present in the MIB table.

It will be appreciated that at step 4, where possible index values between 4 and 10 are to be retrieved, an even spread of speculative seed values within the remainder of the thread could be used, as in step 1, to further reduce the time taken for retrieval. Thus, for example, in step 4 the data packet could specify GetNext 4, GetNext 6 and GetNext 8 which would return the indices 7 and 11. Only one further request, GetNext 7 would then be necessary to retrieve index 8, to complete the table.

It is possible to further reduce the number of GetNext requests necessary to retrieve a MIB table by using seed values corresponding to the stored indices found to be present during previous fetches of the same MIB table. This is particularly advantageous for MIB tables in which the set of values for the local index tends to remain static, as in the present example of the local index object in the protocolDist table.

Accordingly, in the preferred embodiment, for subsequent samples of a MIB table (i.e. where previous requests have been made by the network management station and the results of the local indices present stored), the network management station, uses the first thirty-two indices previously found to be present as the "predicted" values in determining seed values in the first GetNext request data packet. The seed values are thus root and the first thirty-one indices previously found to be present, so that if the indices are unchanged, approximation operations specifying these seed values will retrieve the same thirty-two indices previously retrieved.

If the response returns data at the same local Indices values as predicted, the prediction was correct.

However, if the response returns a higher index value than predicted, then the predicted row must be missing. The network management station considers the returned higher index and if this was the next predicted index takes no further action. The predicted indexed row has been deleted from the table and this fact is stored for future use. Alternatively, if the higher index value was not predicted, it is marked as new and stored for future use and the network management station must then consider whether any indices should be examined to fetch further rows which may have been added. If the network management station determines that another row may be present, it includes an appropriate GetNext request in the subsequent prediction.

Thus, the following second GetNext request consists of any "rollover" requests and enough new predictions to make up the 32 varBinds. The set of new predictions uses any remaining indices from the previous fetch of the MIB table.

The process continues until there are no "rollovers" or predictions (based on previously found indices) to process. The new set of returned localIndex values is stored and used as the seed values/predictors for future use when fetching the MIB table.

It should be noted that subsequent additions and deletions in the table can be inferred by the network management station. In particular, deletions are inferred when two varBinds return the same value. Additions are inferred when a varbind returns an unpredicted object.

EXAMPLE 2

Subsequent Sample #1

Based on the situation described in Example 1, the localIndices previously found in Example 1 are 1 2 4 7 8 11 16 25. These are the predicted values which are stored by the network management station for use as seed values when fetching the same MIB table. In this Example, shown in table 3:

TABLE 3

| | local Index values | | | index values stored as predicted values for next sample | | | | | | |
|---|---|---|---|---|---|---|---|---|---|---|
| request: | — | 1 | 2 | | | | | | | |
| response: | 1 | 2 | 4 | 1 | 2 | 4 | | | | |
| request: | 4 | 7 | 8 | | | | | | | |
| response: | 7 | 8 | 11 | 1 | 2 | 4 | 7 | 8 | 11 | |
| request: | 11 | 16 | 25 | | | | | | | |
| response: | 16 | 25 | — | 1 | 2 | 4 | 7 | 8 | 11 | 16 | 25 | the prediction is correct; no further rows have been added to the table and there have been no deletions. The number of requests by network management station has been reduced even further to three requests, compared with six in Example 1.

EXAMPLE 3

Subsequent Sample #2

Based on the situation described in Example 1, the localIndices previously found in Example 1 are 1 2 4 7 8 11 16 25. These are the predicted values which are stored by the network management station for use as seed values when fetching the same MIB table. In this Example shown in table 4:

TABLE 4

| | local Index values | | | index values stored as predicted values for next sample | | | | | | |
|---|---|---|---|---|---|---|---|---|---|---|
| request: | — | 1 | 2 | | | | | | | |
| response: | 1 | 2 | 4 | 1 | 2 | 4 | | | | |
| request: | 4 | 7 | 8 | | | | | | | |
| response: | 7 | 11 | 11 | 1 | 2 | 4 | 7 | 11 | | |
| request: | 11 | 16 | 25 | | | | | | | |
| response: | 16 | 25 | — | 1 | 2 | 4 | 7 | 11 | 16 | 25 | the prediction is incorrect. The index value 8 is not returned. However, since the GetNext 7 and GetNext 9 requests both returned the value 11, the network management station infers a deletion of the row at index 8. The index value 8 is not included in the predicted values stored for future use.

EXAMPLE 4

Subsequent Sample #3

Based on the situation described in Example 1, the localIndices previously found in EXAMPLE 1 are 1 2 4 7 8 11 16 25. These are the predicted values which are stored by the network management station for use as seed values when fetching the same MIB table. In this Example, shown in table 5:

TABLE 5

| | local Index values | | | Index values stored as predicted values for next sample | | | | | | | | |
|---|---|---|---|---|---|---|---|---|---|---|---|---|
| request: | — | 1 | 2 | | | | | | | | | |
| response: | 1 | 2 | 4 | 1 | 2 | 4 | | | | | | |
| request: | 4 | 7 | 8 | | | | | | | | | |
| response: | 5 | 8 | 11 | 1 | 2 | 4 | 5 | 8 | 11 | | | |
| request: | 5 | 16 | 25 | | | | | | | | | |
| response: | 7 | 16 | 25 | 1 | 2 | 4 | 5 | 7 | 8 | 11 | 16 | 25 |
| request: | 25 | | | | | | | | | | | |
| response: | — | | | | | | | | | | | | the prediction is also incorrect. The response to GetNext 4 is index value 5 which was not predicted. This value is therefore an addition which is noted and stored by the network management station. The predicted value 7 has not been returned in response to the second GetNext request and so in the third GetNext request, the network management station adds a new GetNext request GetNext 5, as a "rollover" along with the next two seed values 11 and 16 based on the prediction. Since the response to GetNext 5 is predicted value 7, the network management station recognises that there is no additional row at index value 6, adds the predicted value 7 to store and continues the process as before.

The method of fetching MIB tables in accordance with the present invention is preferably implemented in network management software which may be provided in the form of a computer program. The computer program may be carried in a computer readable medium such as a disk or computer system.

The computer program steps of the preferred embodiment of the present invention as described above are illustrated in the flow chart of FIGS. 1a, 1b and 2. The program examines the memory of the network management station to determine if a previous fetch of the same MIB table data has taken place and the index values found to be present stored in the memory.

Figure 2:
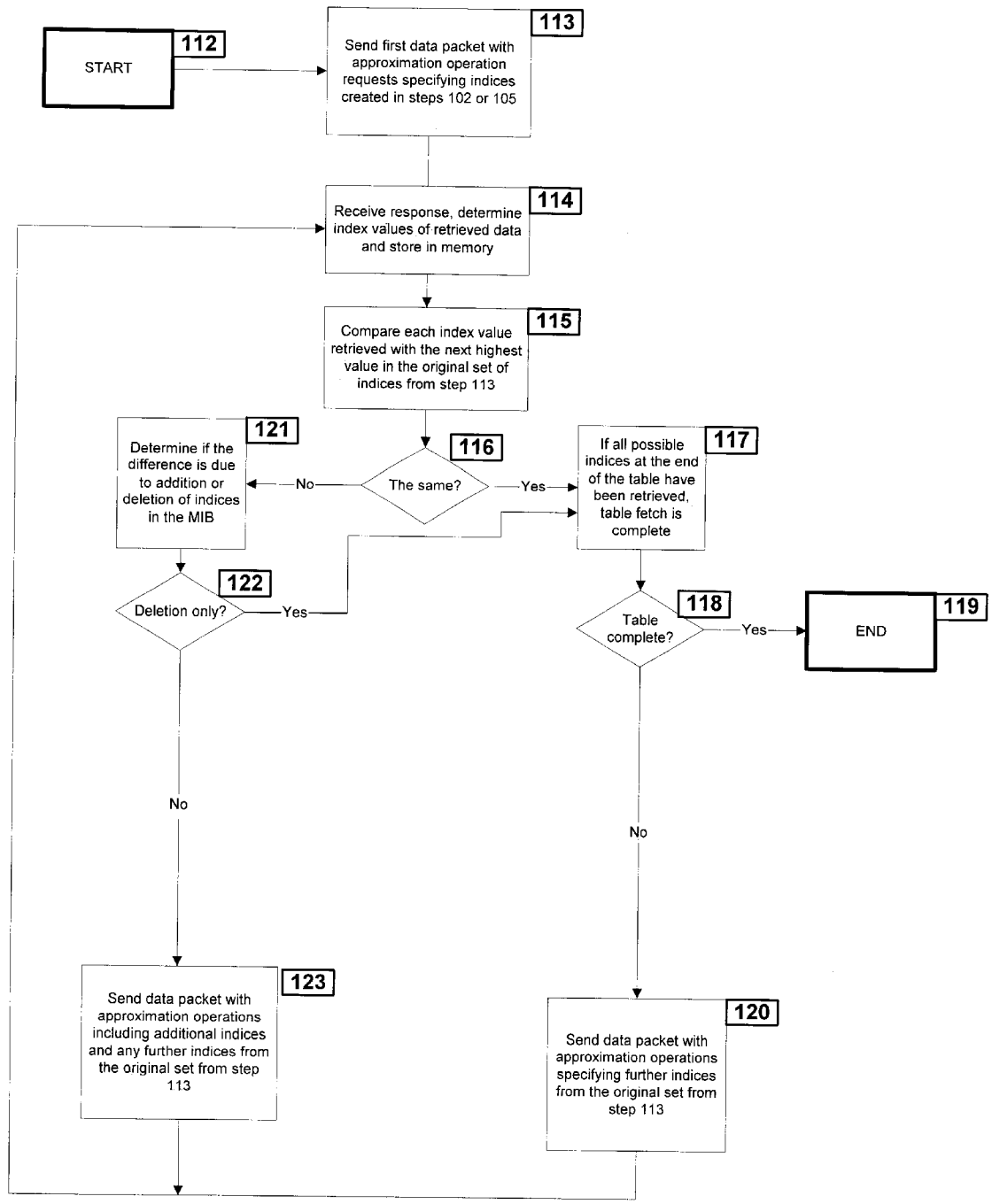

If the program determines that no previous request for the same MIB table data has been made, the program sequence begins with step 101 in FIG. 1a. In step 102 the program creates an initial set of speculative index values, including at least the table root and an even spread of subsequent index values up to the relevant maximum number using equation 1. The program sequence continues with steps 113 in FIG. 2.

Figure 1B:
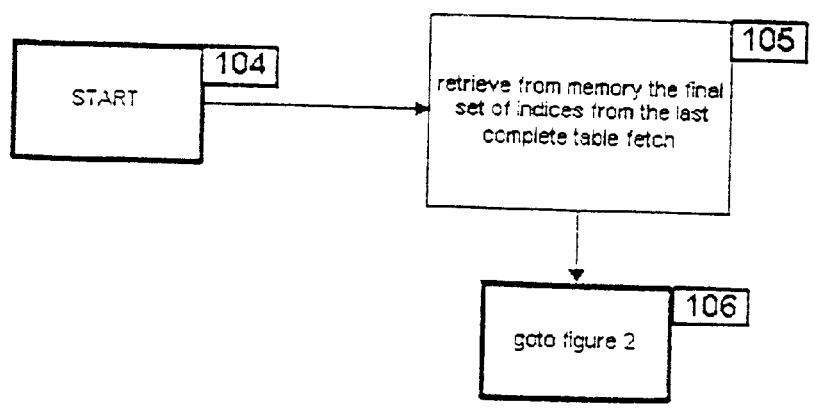

If the program determines that a previous fetch of the same MIB table data has taken place, the program sequence begins with step 104 in FIG. 1b. In step 105 the program retrieves from memory the set of index values retrieved during the previous fetch of the same MIB table. The program sequence continues with step 113 in FIG. 2.

In step 113, the program sends a first data packet with a plurality of approximation operations specifying index values created in step 102 or 105.

In step 114, the program receives a response to the data packet and stores the index values of the retrieved data in memory.

In step 115, the program compares the index values of the retrieved data with the initial index values passed into step 112. Each index value is compared with the next highest or equal index value from the set specified in step 112.

If the comparison determines in step 116 that the index values of the retrieved data are the same as the initial index values, the program continues with steps 117 to 120. If the comparison at step 116 determines that the index values of the retrieved data are not the same as the index values of the previous fetch, the program continues with steps 121 to 123, as described in more detail below.

Accordingly, if the program determines at step 116 that the comparison of the index values in step 115 is the same, at step 117 the program considers whether the table is complete, and if so the program ends at step 119. Otherwise, the program continues at step 120 by sending a subsequent packet with a second plurality of approximations specifying the index values from the original set, from step 113.

The program continues by returning to step 114.

Alternatively, if at step 116, the comparison of the index values of the retrieved data is not the same as the initial index values, at step 121 the program determines whether the difference is due to deletion or addition of index values, or both. If at step 122 it is determined that the difference is only due to the deletion of an index value, the program continues with step 117.

If at step 122 it is determined that new index values have been found, in step 123 the program sends a subsequent packet with a plurality of approximation operations, the first approximation operation specifying an approximation of the missed index values and the other approximations specifying a second plurality of approximations corresponding to index values from the original set, from step 113. The program then continues with step 114.

It will be appreciated from the above description that the method of fetching MIB table data in accordance with the present invention has various applications. Furthermore, it will be understood that the foregoing description is specific to the retrieval of network management data in accordance with the SNMP network management protocol. However, the present invention may be used in other communications protocols, and is not restricted to the particular approximation operation described (ie the GetNext request). For instance, the data may be retrieved from the highest index value to the lowest index value using an approximation operation which retrieves data at the next index value less that the specified approximation of the index value.

The present invention is not limited to the described embodiments but rather includes all such modifications and variations which fall within the scope of the invention as defined in the accompanying claims.

What is claimed is:

1. A method for fetching sparsely indexed data for a data object in a data communications system using a communications protocol which defines a data packet format and an approximation operation, the approximation operation specifying a data object and an index value, whereby the approximation operation retrieves an instance of the specified data object at a closest available index value to, and which is always greater than, the index value specified in the approximation operation, the method comprising: sending a plurality of approximation operations in a first data packet, each one of the plurality of approximation operations specifying the data object, at least one of the plurality of approximation operations specifying a speculative index value.

2. A method as claimed in claim 1, wherein a first of the plurality of approximation operations in the first data packet specifies the data object without an index value, for retrieval of a data object instance at a lowest index value, and the other ones of the plurality of approximation operations specify speculative index values.

3. A method as claimed in claim 1, whereby the data packet format has a predetermined maximum size for operations and the plurality of approximation operations comprise up to the maximum number of approximation operations possible in the data packet size.

4. A method as claimed in claim 1, whereby one or more speculative index values in the first data packet comprise calculated values.

5. A method as claimed in claim 4, wherein the calculated values are determined using the equation:

$$\text{value } n=(n-1) \text{ (max index/max varbind)}$$

where n is an integer greater than or equal to 2, max index is the maximum number for the index value for the data object, and max varbind is the maximum number of operations possible in the data packet size.

6. A method as claimed in claim 1, whereby the speculative index values are determined based on index values of sparsely indexed data obtained during a previous retrieval of the data for said at least one data object.

7. A method as claimed in claim 1, further comprising: receiving data in response to said plurality of approximation operations; determining whether all the indexed data for said at least one object are present in the received data, and if not, sending one or more approximation operations in a second data packet, at least one of the one or more approximation operations specifying an index value of said received data.

8. A method as claimed in claim 7, in which a plurality of approximation operations are included in said second data packet, one or more of said approximation operations in said second data packet specifying index values of said received data and the other approximation operations specifying further speculative index values.

9. A method as claimed in claim 8, whereby the further speculative index values comprise calculated values.

10. A method as claimed in claim 8, whereby the further speculative index values are determined based on index values of sparsely indexed data obtained during a previous retrieval of the data for said at least one data object.

11. A method as claimed in claim 1, further comprising: receiving data in response to said plurality of approximation operations; comparing index values of the received data with the index values of data obtained during a previous retrieval of the data for said at least one object; if the comparison determines a difference between the index values of the received data and the index values of data obtained during said previous retrieval, considering whether additional approximation operations are required to retrieve possible additional data, and if so including approximation operations to retrieve the possible additional data in a second data packet.

12. A method as claimed in claim 11, in which said step of considering whether additional approximation operations are required comprises: considering whether the difference is due to deletion of data at an expected index value, which expected index value was present in said previous retrieval, and if so determining that no additional approximation operations are required.

13. A method as claimed in claim 12, in which said step of considering whether additional approximation operations are required comprises: considering whether the difference is due to addition of data at a new index value, and if so considering if an expected index value greater than the new index value, which expected index value was present in said previous retrieval, is present in the index values of the received data values, and if not including an approximation operation to retrieve data at said expected index value in a second data packet.

14. A method as claimed in claim 13, in which the approximation operation to retrieve data at the expected index value in a second data packet specifies the new index value.

15. A method as claimed in claim 11, in which said step of considering whether additional approximation operations are required comprises: considering whether the difference is due to addition of data at a new index value, and if so considering if an expected index value greater than the new index value, which expected index value was present in said previous retrieval, is present in the index values of the received data values, and if not including an approximation operation to retrieve data at said expected index value in a second data packet.

16. A method as claimed in claim 15, in which the approximation operation to retrieve data at the expected index value in a second data packet specifies the new index value.

17. A method as claimed in claim 1, further comprising receiving a response to said plurality of approximation operations in said first data packet and storing the index values of data, received in said response, in memory.

18. A computer readable medium containing a computer program for carrying out a method for fetching sparsely indexed data for a data object in a data communications system using a communications protocol which defines a data packet format and an approximation operation, the approximation operation specifying a data object and an index value, whereby the approximation operation retrieves an instance of the specified data object at a closest available index value to, and which is always greater than, the index value specified in the approximation operation, the method comprising sending a plurality of approximation operations in a first data packet, each one of the plurality of approximation operations specifying the data object, at least one of the plurality of approximation operations specifying a speculative index value.

19. A computer program on a computer readable medium for fetching sparsely indexed data, for a data object in a data communications system using a communications protocol which defines a data packet format and an approximation operation, the approximation operation specifying a data object and an index value, whereby the approximation operation retrieves an instance of the specified data object at a closest available index value to, and which is always greater than, the index value specified in the approximation operation, the program comprising:

program means for creating a set of speculative index values; and program means for sending a plurality of approximation operations in a first data packet, each one of the plurality of approximation operations specifying the data object, at least one of the plurality of approximation operations specifying one of said set of speculative index values.

20. A method for fetching sparsely indexed data for a data object in a data communications system using a communications protocol which defines a data packet format and an approximation operation, the approximation operation specifying a data object and an index value, whereby the approximation operation retrieves an instance of the specified data object at a closest available index value to, and which is always less than, the index value specified in the approximation operation, the method comprising: sending a plurality of approximation operations in a first data packet, each one of the plurality of approximation operations specifying the data object, at least one of the plurality of approximation operations specifying a speculative index value.

* * * * *